United States Patent
Klingler et al.

(10) Patent No.: US 6,208,948 B1
(45) Date of Patent: Mar. 27, 2001

(54) COMPUTER-ASSISTED DIAGNOSTIC DEVICE AND DIAGNOSTIC PROCESS FOR ELECTRONICALLY CONTROLLED SYSTEMS

(75) Inventors: Michael Klingler, Korb; Peter Spiegel, Aichwald, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/099,935

(22) Filed: Jun. 19, 1998

(30) Foreign Application Priority Data

Jun. 19, 1997 (DE) .............................. 197 25 916

(51) Int. Cl.$^7$ ................................. G01M 17/00
(52) U.S. Cl. ............................. 702/183; 701/29
(58) Field of Search .................... 395/917, 913, 395/912, 905, 916; 318/474, 478, 481; 700/286, 75, 90, 1; 364/424.03; 361/1; 324/500, 512; 128/920; 600/300; 188/158, 182; 455/343; 369/100

(56) References Cited

U.S. PATENT DOCUMENTS 4,853,850 * 8/1989 Krass, Jr. et al. .................... 364/200
5,541,840 * 7/1996 Gurne et al. ..................... 364/424.03

FOREIGN PATENT DOCUMENTS 195 41 816 * 5/1996 (DE) .............................. G01M/17/00

2 305 818 * 4/1997 (GB) ............................. H04M/11/00

OTHER PUBLICATIONS

ZWF 91 (1996) 12 entitled "Maschinendiagnose über das Internet" by Jörg Krüger and Andreas Neubert, pp. 604–606.

* cited by examiner

Primary Examiner—Marc S. Hoff
Assistant Examiner—Edward Raymond
(74) Attorney, Agent, or Firm—Evenson, McKeown, Edwards & Lenahan, P.L.L.C.

(57) ABSTRACT

A computer-assisted diagnostic device for electronically controlled systems, which are arranged in an overall system, and a diagnostic process which can be implemented by means of a computer are provided. The diagnostic device and process are suitable for electronically controlled systems in a motor vehicle. Computers of a second type pertaining to the diagnostic device can at any time exchange by way of networks based on Internet technology current data and programs with a computer of a first type. The frequently changed and adapted diagnostic programs must only be filed on the computer of the first type, which considerably reduces the establishment and maintenance expenditures for the diagnostic programs and completely eliminates the program distribution expenditures. In the computers of the second type, dynamically loadable libraries are filed. The diagnostics program loaded into a computer of the second type is expanded by these libraries and is therefore enabled to intervene in the electronically controlled systems, if devices exist for permitting the interaction between the computer of the second type and the electronically controlled systems of an overall system.

19 Claims, 3 Drawing Sheets

COMPUTER-ASSISTED DIAGNOSTIC DEVICE AND DIAGNOSTIC PROCESS FOR ELECTRONICALLY CONTROLLED SYSTEMS

BACKGROUND AND SUMMARY OF THE INVENTION

This application claims the priority of German Application No. 197 25 916.2, filed Jun. 19, 1997, the disclosure of which is expressly incorporated by reference herein.

The invention relates to a computer-assisted diagnostic device for electronically controlled systems, particularly for electronically controlled systems in a motor vehicle. Furthermore, the invention relates to a diagnostic process for electronically controlled systems which can be carried out by means of a computer.

The increasing complexity of the electronically controlled systems in a motor vehicle requires diagnostic devices which can read out the data of these systems specific for each vehicle type and can transmit them to the equipment available for repair purposes.

In the case of the currently used diagnostic processes, the vehicle type, the series and the respective variant are determined first. Then the diagnostic apparatus, which is appropriate for the vehicle type, with the display device and the keyboard is connected to the diagnostic socket. By way of the diagnostic socket, the status of the electronically controlled system can be queried and can be read out by way of the diagnostic apparatus.

A diagnostic system for a motor vehicle having a portable diagnostic apparatus is known, for example, from German Patent Document DE 195 41 816 A1. The portable diagnostic apparatus is connected by way of an adapter with a control unit installed in the motor vehicle for the diagnosis. In the lower part of the diagnostic apparatus, a memory cassette is inserted on which the design data of a certain motor vehicle type and the diagnostic program are stored for the respective electronic system which is to be examined.

Although such a portable diagnostic apparatus is flexible with respect to its use in many different motor vehicle types and diagnostic objects, the memory cassettes require regular maintenance and exchange in the case of frequently changing vehicle design data and changes in the electronic systems to be diagnosed. Therefore, a large number of such memory cassettes with vehicle-specific data must be kept in repair shops and the stock must constantly be supplemented.

It is an object of the present invention to provide a computer-assisted diagnostic device as well as a diagnostic process for electronically controlled systems in order to considerably reduce the establishment and maintenance expenditures for the diagnostic hardware and software without having to change the already existing electronically controlled systems.

This object is achieved by a computer-assisted diagnostic system for electronically controlled systems arranged within an overall system, particularly for electronically controlled systems in a motor vehicle. The diagnostic system contains: (1) a computer of a first type which exists outside the overall system and which contains an expandable diagnostics program and, in addition, contains data of a first type, the data of the first type essentially comprising the diagnosis-relevant data of the electronically controlled systems; (2) one or several computers of a second type available at any location which contain dynamically loadable libraries for expanding the diagnostics program, the diagnostics program expanded by the dynamically loadable libraries being capable of accessing the electronically controlled systems; and (3) devices for permitting an interaction (interface) between a computer of the second type and the electronically controlled systems of an overall system, the computer of the first type and the computers of the second type being capable of exchanging data and programs with one another by way of networks based on Internet technology. The computer of the first type is precisely a server set up at a central point, and the data, in addition, comprise the data and diagnostic results generated by the intervention of the expanded diagnostics program in the electronically controlled systems. A diagnostic process for achieving the object includes the acts of (1) loading a diagnostics program filed in a computer of the first type and loading of data of the first type, which essentially comprise the diagnosis-relevant data of the electronically controlled systems in one or several computers of the second type available at one or several arbitrary locations, the diagnostics program being transmitted by way of a network based on Internet technology from the computer of the first type to the computer or computers of the second type; (2) expanding the loaded diagnostics program by directly loadable libraries filed in each computer of the second type; and (3) implementing the expanded diagnostics program, the expanding diagnostics program intervening by way of devices for permitting an interaction between a computer of the second type and the electronically controlled systems of an overall system into the electronically controlled systems. In the process, the computer of the first type is precisely a server set up at a central point, and the data of the first type, in addition, comprises the data and diagnostic results generated by the intervention of the expanded diagnostic program in the electronically controlled systems.

The computers of a second type pertaining to the diagnostic device can exchange data and programs with the computer of a first type by way of networks based on Internet technology. The frequently changed and adapted diagnostics programs must only be filed in the computer of the first type. This considerably reduces the establishment and maintenance expenditures for the diagnostics programs and completely eliminates the program distribution expenditures. The computers of the second type can request the current diagnostics program from the computer of the first type at any time and the updated diagnostics program can be retrieved by way of a network based on Internet technology from the computer of the first type into the computer of the second type.

Dynamically loadable libraries are filed in the computers of the second type. The diagnostics program loaded into a computer of the second type is expanded by these libraries and is therefore enabled to intervene in the electronically controlled systems if devices exist for permitting an interaction or interface between the computer of the second type and the electronically controlled systems of an overall system. The dynamically loadable libraries expand the diagnostics program such that it can intervene directly in the electronically controlled systems to be examined without the requirement of making changes in these systems, either on their hardware or on their software configuration.

Therefore, the diagnostic device with an application-specific diagnostics program which can be expanded by suitable dynamically loadable libraries can easily be used for any already existing, electronically controlled systems which are arranged within an overall system without the requirement of making any changes on the electronically controlled systems themselves.

Additional advantageous developments and further developments of the diagnostic device according to the invention and of the diagnostic process according to the invention are described herein.

It is particularly advantageous to store the diagnosis-relevant data of the electronically controlled systems in the computer of the first type set up at a central point because, in the case of changes in the system configuration, this requires only an updating of the data in the first computer and, in addition, saves a considerable amount of storage space in the computers of the second type.

It is also very advantageous for the diagnostics program expanded by the directly loadable libraries to transfer the data and diagnostics results generated by the intervention in the electronically controlled systems to the computer of the first type and for these data and results to be stored there. This eliminates the manual input of the data and results, and the current results obtained during a diagnosis are immediately available on the computer of the first type for other users of the diagnostic device.

Other objects, advantages and novel features of the present invention will become apparent from the following detailed description of the invention when considered in conjunction with the accompanying drawings.

DETAILED DESCRIPTION OF THE DRAWINGS

Figure 1:
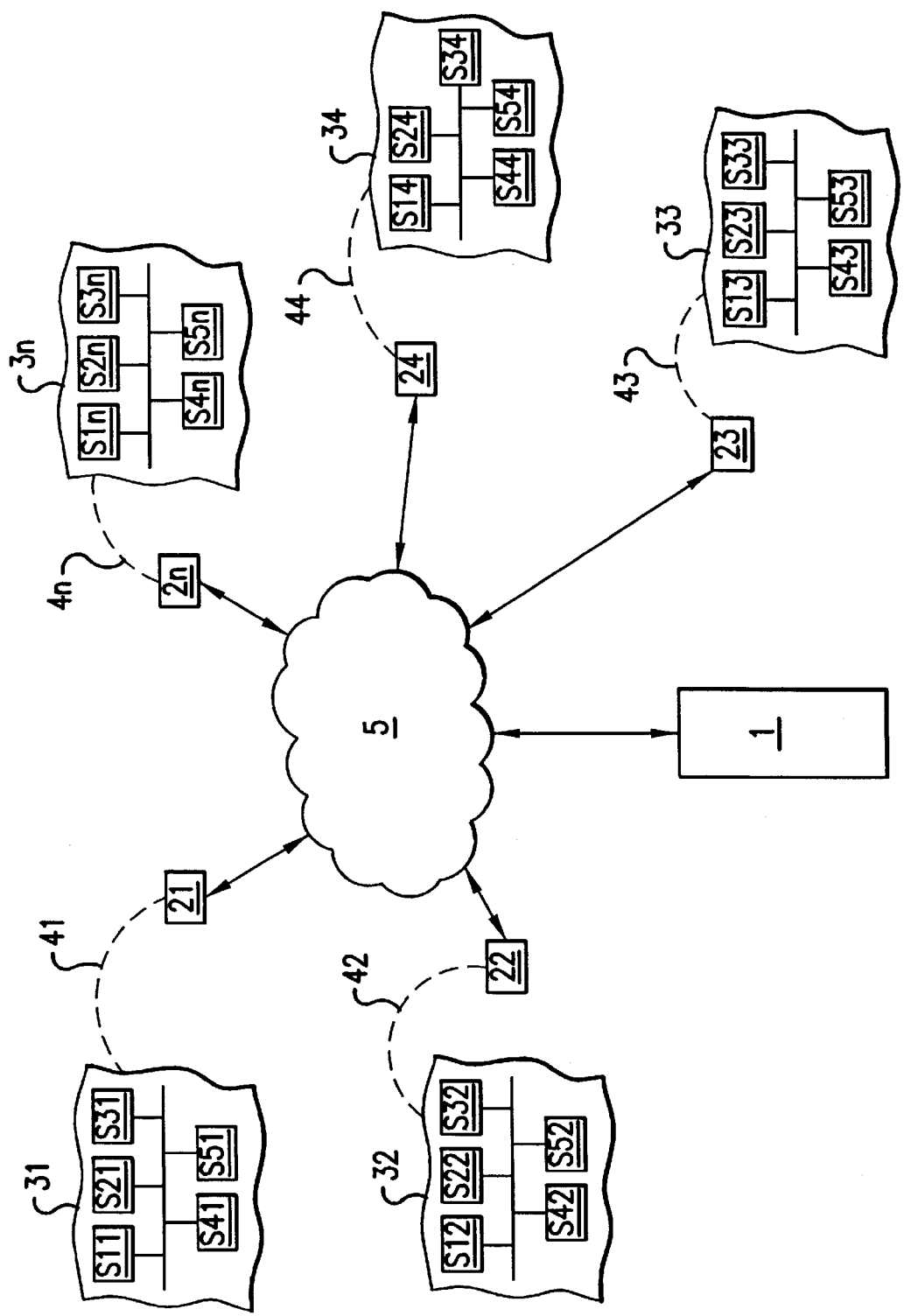
FIG. 1 is a schematic block diagram of a computer-assisted diagnostic device for electronically controlled systems of an overall system.

FIG. 1 shows several overall systems 31, 32, 33, 34 ... 3n in which, in each case, several—here, for example, five—electronically controlled systems (S11, S21, S31, S41, S51) ... (S1n, S2n, S3n, S4n, S5n) are arranged, n being a natural number. The individual electronically controlled systems within one overall system are connected with one another, for example, by means of a data bus.

An overall system 3n may, for example, be a motor vehicle. The electronically controlled systems S1n, S2n, S3n, S4n, S5n then comprise, for example, the engine, the transmission, the brakes, the emissions control, various comfort functions, such as an automatic seat adjustment, electric window lift mechanisms, etc., the air conditioner, the chassis tuning, and many others. According to the vehicle type and model line, these may be as few as one or up to 50 or more different electronically controlled systems.

An overall system may, for example, also be a product line, a warehouse stock, a distribution center or a complex tool or other electronic equipment. The electronically controlled systems in this case, for example, include electronically controlled production machines, robot systems, lifting devices, transport devices, etc.

Figure 2:
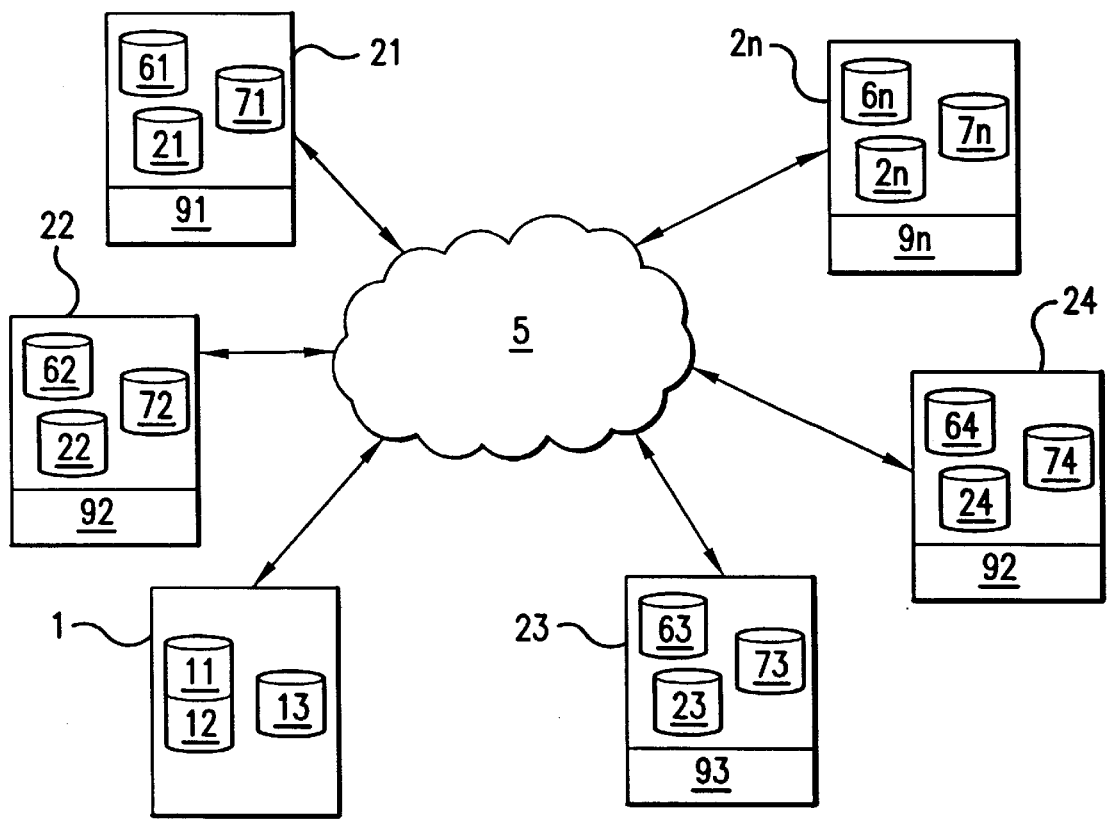
FIG. 2 is another schematic block diagram of the essential data contents and program contents of the computer of the first type and of the computer of the second type.

The computer of the first type 1, which preferably is constructed as a server, is situated outside the overall systems 31 ... 3n and at a central point. As illustrated in FIG. 2, the server 1 contains an expandable diagnostics program 13 which is generated and filed on the server as well as data of a first type 11, 12. The data of the first type comprise essentially the diagnosis-relevant data 11 of the electronically controlled systems S1n, ... S5n.

If the overall system is a motor vehicle, the diagnosis-relevant data comprise the vehicle-specific data required for identifying the vehicle, such as the vehicle type, the model line, the construction condition, the equipment variant, production data, etc. as well as current information concerning the respective vehicle type or the model line.

The diagnostic data relevant to the respective system may, for example, be physical parameters, such as the brake pressure, the temperature and the viscosity of the brake fluid, the rotational engine speed, etc., the chemical composition of the brake fluid with an indication of the percentage by weight of the constituents or other data. Furthermore, the data of the first 15 type include the data and diagnostic results generated by the intervention of the expanded diagnostics program 13 in the electronically controlled systems S1n... S5n, which may contain, for example, fault trees and fault logs.

As illustrated in FIG. 1, a computer of a second type 21, 22, 23, 24 ... 2n exists for each overall system 3n. However, a computer of the second type may also be assigned to two or more overall systems and may be set up at any location. A computer of the second type may be any commercially available standard type hardware from any manufacturer, such as a personal computer, a network computer, a workstation computer or a portable computer, etc. However, it is a prerequisite that the computers of the second type 21 ... 2n are capable of exchanging programs and data with the server by way of networks 5 based on Internet technology. The Internet-based networks 5 may be the Internet, or for example, a company's in-house intranet, or a regional network.

For visualizing the data of the first and second type, the computers of the second type are equipped with display devices 91, 92, 93, 94 ... 9n, such as a monitor or a display.

For the endeavored interaction between a computer of the second type and the electronically controlled systems, devices 41, 42, 43, 44 ... 4n are required which make this possible. Such devices comprise a diagnostic interface mounted on the overall system and a connection constructed as a fixed wiring or as a radio link. The fixed wiring may be constructed, for example, as a plug at the diagnostic interface, and for the radio link, for example, a radio module is required which can be mounted on the diagnosis interface.

As illustrated in FIG. 2, the computers of the second type 21 ... 2n contain dynamically loadable libraries 71, 72, 73, 74, 7n and 81, 82, 83, 84, 8n. The diagnostics program 13 loaded by the server 1 into the computer of the second type can be expanded by these directly loadable libraries. This expansion enables the diagnostics program 13 to interact from a computer of the second type by way of the devices 41 ... 4n directly with the electronically controlled systems of an overall system and intervene directly in the electronically controlled systems.

If an overall system is a motor vehicle, the expanded diagnostics program 13, for diagnostic purposes, can, for example, open the throttle valve, activate the antilock system, etc.

Furthermore, the computers of the second type additionally contain data of the second type 61, 62, 63, 64 ... 6n which essentially comprise the actual values of the electronically controlled systems in real time. These real-time data are transmitted by devices 41 ... 4n for permitting an interaction from the electronically controlled systems or from an overall system directly to the computer of the second type and are processed there by the expanded diagnostics program 13, are displayed upon request and are then stored in the computer of the second type or are transmitted to the server 1.

The data of the second type may also include several system specific data for identifying the overall system or a single electronically controlled system. Likewise, the data of the second type may additionally also contain the diagnostic results or some diagnostic results, such as fault trees or fault logs.

Figure 3:
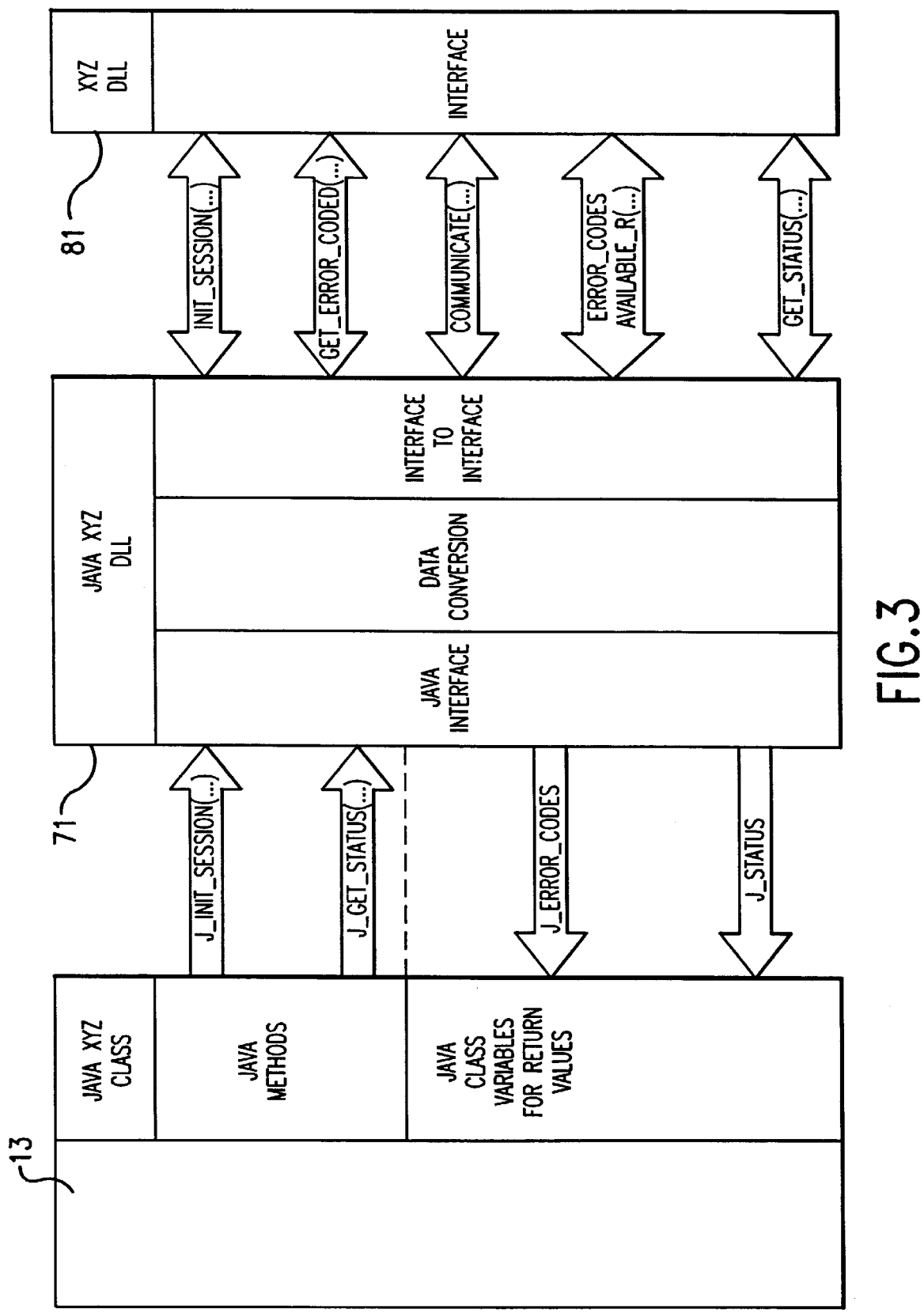
FIG. 3 is a schematic view of the construction of the expanded diagnostics program.

FIG. 3 is a schematic representation of the construction of an expanded diagnostics program with the example of a diagnostics program 13 programmed as a JAVA Applet. The JAVA Applet contains a JAVA XYZ CLASS. This class forms the access to the data of the second type, essentially to the actual values in real time of the electronically controlled systems of an overall system XYZ to be examined.

The dynamically loadable library 71 added from the computer of the second type is called JAVA XYZ DLL and is divided into three mutually separated layers.

The first layer—JAVA interface—represents the interface between the JAVA code and the code in which the actual interface is programmed. In the example of FIG. 3, this is the C-code. The main task of this layer is the transmission of diagnostic instructions. Data are exchanged in both directions; on the one hand, from the JAVA Applet into this layer and also in the other direction to the JAVA Applet. In this case, the JAVA interface layer transmits the data and diagnostic results generated by the intervention of the expanded diagnostics program in the electronically controlled systems to the JAVA Applet.

The second layer, which is called data conversion, is responsible for converting the delivery values coming from both directions. This is necessary since, because of the different memory formats of the data types in the C-code and in the JAVA code, no direct compatibility exists between the delivery values.

The third layer—called interface to interface—integrates the dynamically loadable library 81, which is called the XYZ DLL interface, and thereby ensures the functionality of the dynamically loadable library 81. It provides the different indicated function calls, such as init_session or finit_session. These are required in order to, for example, initialize the interface 81 or terminate the connection to the interface 81 after the conclusion of a diagnosis.

These functions, which are indicated as examples, and others are converted by the second and third layer of the dynamically loadable library 71—JAVA XYZ DLL—such that they can be used from the JAVA Applet.

Because of JAVA language codes, the implementation of the interfaces is solved differently on the right and on the left of the JAVA XYZ DLL in this example. Since JAVA does not support pointer processing, the delivery of values was divided into two sections. The upper section provides the transition from the JAVA Applet to the JAVA XYZ DLL by using method calls from JAVA. The lower section solves the transition into the opposite direction, in which case member variables of the JAVA XYZ CLASS are addressed from the JAVA XYZ DLL and return values can be delivered into the JAVA Applet.

For the reading-out of error codes, the dynamically loadable library 81 provides, for example, the following functions:

int get_error_codes (cu_name, error_type, error_codes, &error_count, &event);   (1)

The name of the electronically controlled apparatus, the error type, the error codes contained in the apparatus as well as the number of errors which occurred during a communication sequence are indicated. In the JAVA Applet 13, the JAVA XYZ CLASS provides the corresponding method:

public native int J_get_error_codes (String cu_name, int error_type);   (2)

By means of this method, which characterizes by the key word "native" that its root is implemented in the language C in the dynamically loadable library 71, the values to be delivered can be delivered to the function call (1).

After receiving the two values "cu_name" and "error_type", the function call (1) can read the error codes out of the corresponding electronically controlled apparatuses. After this has taken place, the return values of the directly loadable library 71 must arrive in the JAVA Applet 13.

For this purpose, a macro written in C-language is integrated in the directly loadable library 71 by means of a header file and the pertaining library:

unhand(this)>J_event=(long)event;   (3)

unhand(this)>J_error_codes

=makejAVAString(error_codes, strlen(error_codes));   (4)

unhand(this)>J_error_count=(long)error_count;   (5)

This macro permits the return of the three return values to the JAVA XYZ CLASS.

In the macro (4), "unhand(this)>" is a macro written in C for dereferencing a JAVA object; in the example described here, it is an entity from the JAVA XYZ CLASS. "J_error_codes" is an access operator by means of which access is provided to J_error code of the current entity. "makeJAVAString( . . . )" converts a C-string into a JAVA-string indicating the C-string and its length.

After the delivery of the data to the current entity of the JAVA XYZ CLASS, they are available there for further processing and can be displayed, for example, by display devices 91 . . . 9n.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Computer-assisted diagnostic device for electronically controlled systems arranged within an overall system, the diagnostic device comprising:

a computer of a first type which exists outside the overall system and which contains an expandable diagnostics program and, in addition, contains data of a first type, said data of the first type essentially comprising diagnosis-relevant data of the electronically controlled systems;

one or more computers of a second type available at any location which contain dynamically loadable libraries for expanding the expandable diagnostics program, the diagnostics program expanded by the dynamically loadable libraries being capable of accessing the electronically controlled systems; and devices for permitting an interaction between a computer of the second type and the electronically controlled systems of an overall system, the computer of the first type and the one or more computers of the second type being capable of exchanging data and programs with one another by way of networks based on Internet technology, wherein the computer of the first type is a server set up at a central point and the data of the first type additionally comprising data and diagnostic results generated by an intervention of the expanded diagnostics program in the electronically controlled systems.

2. Computer-assisted diagnostic device according to claim 1, wherein the one or more computers of the second type additionally contain data of a second type, said data of the second type essentially containing actual values of the electronically controlled systems in real time.

3. Computer-assisted diagnostic device according to claim 1, wherein the dynamically loadable libraries are programmed in the C-language.

4. Computer-assisted diagnostic device according to claim 2, wherein the dynamically loadable libraries are programmed in the C-language.

5. Computer-assisted diagnostic device according to claim 3, wherein the expandable diagnostic program is programmed as a JAVA Applet.

6. Computer-assisted diagnostic device according to claim 1, wherein the devices for permitting the interaction between the electronically controlled systems of an overall system and a computer of the second type have a diagnostic interface and a connection constructed as one of a fixed wiring and a radio link.

7. Computer-assisted diagnostic device according to claim 1, wherein the one or more computers of the second type have display devices for displaying data of the first and of the second type.

8. Computer-assisted diagnostic device according to claim 1, wherein the overall system is a motor vehicle system having the electronically controlled systems therein.

9. Diagnostic process for electronically controlled systems arranged within an overall system which can be implemented via computers, the diagnostic process comprising the acts of:
   loading a diagnostics program filed in a computer of a first type and loading of data of a first type, which essentially comprise diagnosis-relevant data of the electronically controlled systems in one or more computers of a second type available at one or several arbitrary locations, the diagnostics program being transmitted by way of a network based on Internet technology from the computer of the first type to the one or more computers of the second type, the computer of the first type and the one or more of the second type being capable of exchanging data and programs with one another;
   expanding the loaded diagnostics program by directly loadable libraries filed in each computer of the second type; and
   implementing the expanded diagnostics program, the expanding diagnostics program intervening, by way of devices for permitting an interaction between a computer of the second type and the electronically controlled systems of the overall system, into the electronically controlled systems; and
   wherein the computer of the first type is a server set up at a central point, and the data of the first type additionally comprises data and diagnostic results generated by the intervention of the expanded diagnostic program in the electronically controlled systems.

10. Diagnostic process according to claim 9, wherein the act of implementing the expanded diagnostic program comprises the act of integrating data of the second type into the one or more computers of the second type, the data of the second type comprising essentially the actual values of the electronically controlled systems in real time.

11. Diagnostic process according to claim 9, wherein the diagnostic process comprises the additional act of displaying the data of the first type and of the second type.

12. Diagnostic process according to claim 10, wherein the diagnostic process comprises the additional act of displaying the data of the first type and of the second type.

13. Diagnostic process according to claim 11, wherein the diagnostics program is programmed as a JAVA Applet, the dynamically loadable libraries are programmed in C-language, and the data of the first type and of the second type are displayed as a WEB site on display devices of the one or more computers of the second type.

14. Diagnostic process according to claim 12, wherein the diagnostics program is programmed as a JAVA Applet, the dynamically loadable libraries are programmed in C-language, and the data of the first type and of the second type are displayed as a WEB site on display devices of the one or more computers of the second type.

15. Diagnostic process according to claim 9, wherein the step of implementing the expanded diagnostics program comprises the act of transmitting data and diagnostic results generated by the intervention of the expanded diagnostics program in the electronically controlled systems to the computer of the first type and the storing of these data and diagnostic results as data of the first type in the computer of the first type.

16. Diagnostic process according to claim 10, wherein the step of implementing the expanded diagnostics program comprises the act of transmitting data and diagnostic results generated by the intervention of the expanded diagnostics program in the electronically controlled systems to the computer of the first type and the storing of these data and diagnostic results as data of the first type in the computer of the first type.

17. Diagnostic process according to claim 11, wherein the step of implementing the expanded diagnostics program comprises the act of transmitting data and diagnostic results generated by the intervention of the expanded diagnostics program in the electronically controlled systems to the computer of the first type and the storing of these data and diagnostic results as data of the first type in the computer of the first type.

18. Diagnostic process according to claim 13, wherein the step of implementing the expanded diagnostics program comprises the act of transmitting data and diagnostic results generated by the intervention of the expanded diagnostics program in the electronically controlled systems to the computer of the first type and the storing of these data and diagnostic results as data of the first type in the computer of the first type.

19. Diagnostic process according to claim 9, wherein the overall system is a motor vehicle system having the electronically controlled systems therein.

* * * * *